United States Patent

[11] 3,613,543

[72] Inventors Kunio Mita
 Yamato-Machi;
 Yukio Umemura, Tokyo, both of Japan
[21] Appl. No. 46,988
[22] Filed June 17, 1970
[45] Patented Oct. 19, 1971
[73] Assignee Asahi Kogaku Kogyo Kabushiki Kaisha
 Tokyo-to, Japan
[32] Priority June 24, 1969
[33] Japan
[31] 44/49,304

[54] VIEWFINDER SHIELD FOR A CAMERA WITH A SELF-TIMER
 10 Claims, 4 Drawing Figs.
[52] U.S. Cl........................................................ 95/42,
 95/53.3
[51] Int. Cl........................................................ G03b19/12,
 G03b 9/64
[50] Field of Search............................................ 95/42, 53.3

[56] References Cited
 UNITED STATES PATENTS
3,008,397 11/1961 Winkler.......................... 95/42
3,350,992 11/1967 Starp et al...................... 95/53.3

Primary Examiner—John M. Horan
Assistant Examiner—Michael D. Harris
Attorney—Steinberg & Blake ABSTRACT: A camera having the possibility of shielding the viewfinder. The viewfinder of the camera provides a predetermined path for the viewfinder light. A shielding element is movable from a nonshielding position to a shielding position extending across the latter path to interrupt the travel of viewfinder light. When a self-timer of the camera is set for operation the shielding component is capable of moving to its shielding position. However, a releasable holding device holds the shielding component in its nonshielding position until operation of the self-timer is actually started. It is only in response to starting of the operation of the self-timer that the shielding component is released for movement to its shielding position.

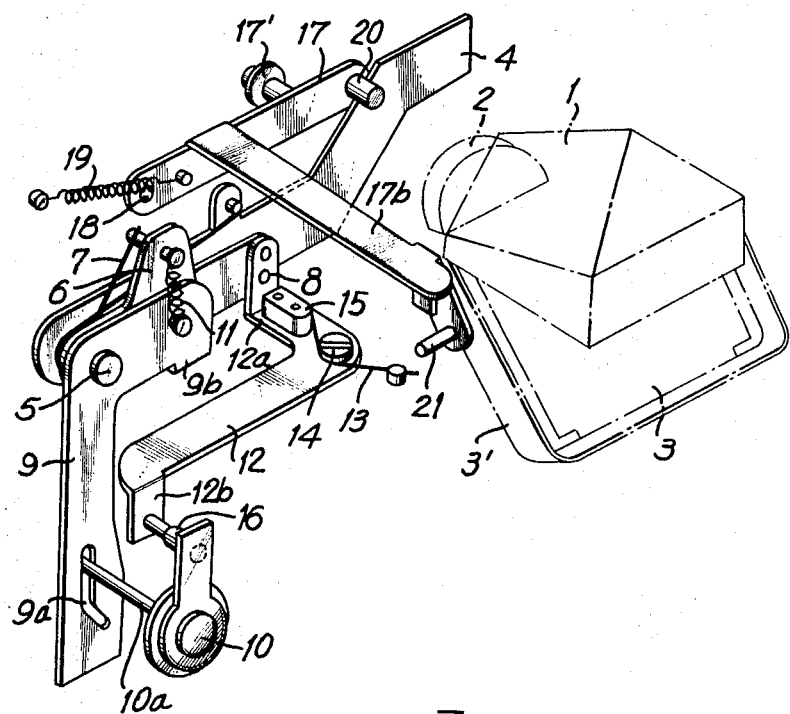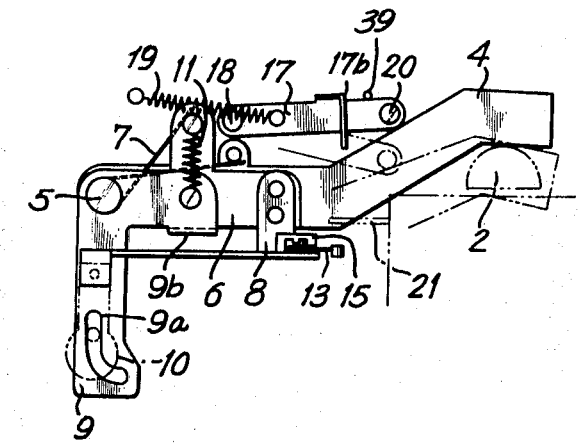

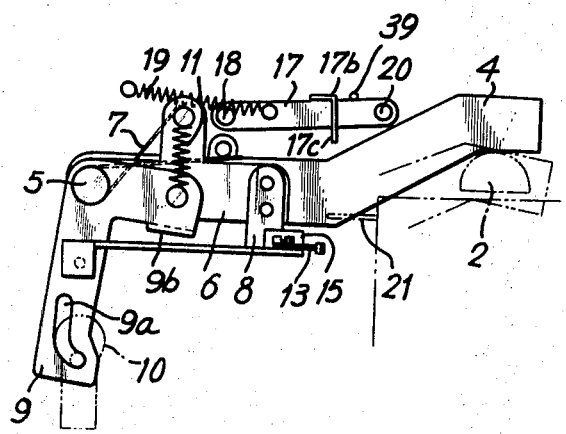
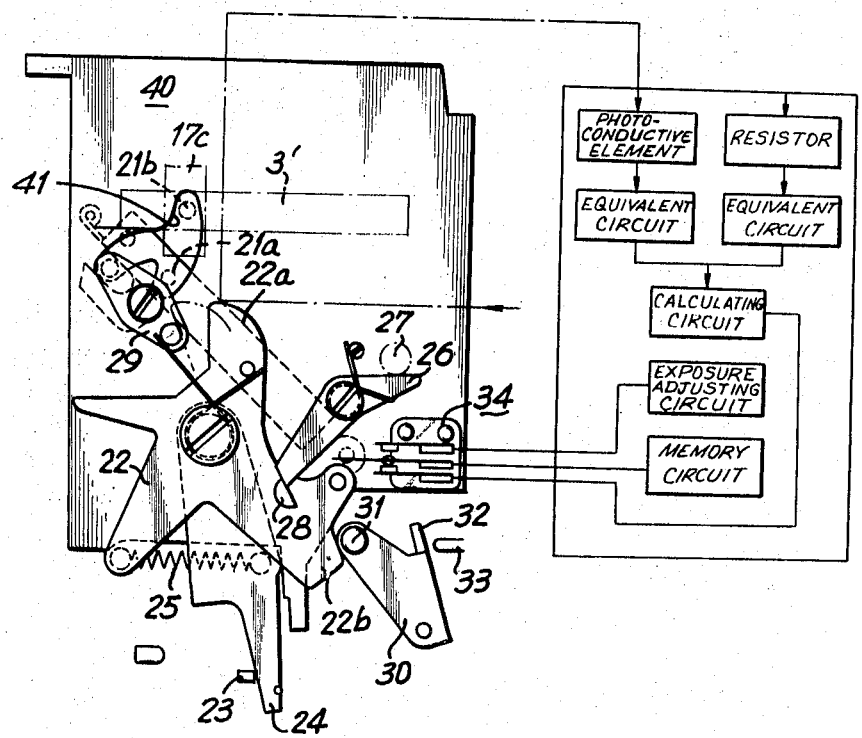

VIEWFINDER SHIELD FOR A CAMERA WITH A SELF-TIMER

BACKGROUND OF THE INVENTION

The present invention relates to cameras.

In particular, the present invention relates to structures for shielding the viewfinder of a camera.

In certain types of cameras it is desirable to shield the viewfinder under given operating conditions. This is particularly the case in cameras where the extent of exposure is determined by measurement of light which has already travelled through the objective. Thus, many present-day cameras have interior light-measuring devices for determining the extent of exposure in accordance with measurement of light which has already travelled through the objective. It is particularly with cameras of this type that undesirable results may be encountered because of light which enters through the viewfinder. Under normal operating conditions, the extremely small amount of light which might happen to enter through the viewfinder is of no consequence. However, in certain types of photography such as microscopic, contiguous, or self-timer operations, the factor of light which might enter through the viewfinder cannot be ignored. For example, during self-timer operation of a camera, the operator will not be looking into the viewfinder, so that during the relatively extended period when the self-timer runs down, it is possible for a substantial amount of light to enter through the viewfinder and influence the exposure setting which is automatically determined with light which is received in the camera.

Of course, this problem has been recognized, and there are known devices which are designed to shield the viewfinder under conditions such as those referred to above. Thus, it is known to provide a viewfinder shield in the form of a cover situated on a receiver for a cable release or a self-timer, the arrangement being such that the shielding effect is achieved in association with opening-and-closing movement of the cover. Such a construction has proved in practice, however, to be very troublesome in operation because the cover must be removed when the camera is reset to as to photograph a object at a different distance, for example. The cover must be removed after each self-timer operation in order to again render the viewfinder useful for setting of the camera.

Also, it is known to provide an arrangement according to which the shielding is associated with energy-storing operations in connection with actuation of the self-timer. However, this type of construction also has not proved to be satisfactory in practice. For example, with these known devices, once the self-timer has been activated preparatory to operation thereof, the shield is in its light-shielding position and it is no longer possible to make any changes in the camera setting. Thus, extreme caution must be carried out all of the operations in connection with determination of the exposure, prior to setting the self-timer in a position where it is activated and ready to operate.

Furthermore, it is highly desirable under certain circumstances to be able to manually set a viewfinder shield in a shielding position independently of any self-timer operation, without the inconvenience of remembering to return the shield to its nonshielding position after an exposure has been made, and the known constructions also are incapable of achieving these results.

SUMMARY OF THE INVENTION

It is accordingly a primary object of the present invention to provide a camera with a construction which will avoid the above drawbacks.

In particular, it is an object of the invention to provide a viewfinder shield which will respond to self-timer operation in order to shield viewfinder, but which will not assume a shielding position until the self-timer actually is started. Thus, it becomes possible to activate the self-timer so that it is ready to operate, while at the same time the shield is in its nonshielding position until the self-timer actually is started, so that in this way exposure adjustments can still be made even after the self-timer is activated, A further object of the invention is to provide a construction which will automatically return the shield to a nonshielding position when the self-timer returns to its rest position.

Furthermore, it is an object of the invention to provide a construction which gives the operator the possibility of manually placing the shield in its shielding position independently of self-timer operation.

Also, it is an object of the invention to provide a construction which will automatically return the shield to its nonshielding position, after it has been manually set in its shielding position independently of self-timer operation, upon completion of an exposure.

It is furthermore an object of the invention to provide components capable of accomplishing the above objects while at the same time being relatively simple and rugged and very reliable in operation.

According to the invention the camera has a viewfinder which provides a predetermined path for the viewfinder light. A shielding means has a nonshielding position situated beyond this latter path. A support means supports the shielding means for movement from its nonshielding position to a shielding position extending across the latter path so as to interrupt the travel of viewfinder light. A releasable holding means coacts with the shielding means for releasably holding the latter in its nonshielding position. A manually operable self-timer setting means normally has an inactive position but can be manually displaced to an activating position activating the self-timer so that it is ready to operate. A manually operable starting means is also provided for starting the operation of the self-timer. This starting means coacts with the releasable holding means to displace the latter from a holding position where it releasably holds the shielding means in its nonshielding position to a release position where it releases the shielding means for movement to its shielding position, so that the shielding means will assume its shielding position only upon actual starting of the self-timer by the manually operable starting means.

BRIEF DESCRIPTION OF THE INVENTION

The invention is illustrated by way of example in the accompanying drawings which form part of this application and in which:

FIG. 1 is a perspective illustration of an embodiment of the invention with viewfinder components shown in phantom lines;

FIG. 2 is a front elevation showing the parts of FIG. 1 in a rest position with the shielding means shown in phantom lines in its shielding position and with a manually operable lever also shown in phantom lines in a position to which it has been manually displaced;

FIG. 3 shows the structure of FIGS. 1 and 2 in the position which the parts take after the self-timer has been activated and is ready to operate; and FIG. 4 is a schematic representation of mechanism associated with the tiltable mirror of a single-lens reflex camera together with a block diagram of circuit components used in connection with automatic exposure determination.

DESCRIPTION OF A PREFERRED EMBODIMENT

Referring first to FIG. 1 of the drawings, there is schematically represented therein, in phantom lines, components of a viewfinder means which provides a predetermined path for the viewfinder light. This viewfinder means includes the pentagonal roof prism 1 which receives light reflected from the tiltable mirror 3, these components being well known in single lens reflex cameras. The light reaches the mirror 3 after having passed through the objective. From the roof prism 1 the light travels to a magnifying lens 2 of the viewfinder.

A shielding means is provided for movement between a nonshielding position spaced from the path of viewfinder light and a shielding position extending across this path to interrupt the travel of the viewfinder light. This shielding means includes a shielding lever 4 and control lever 6. It is the right free end portion of the shielding lever 4, as viewed in FIGS. 1-3, which performs the actual shielding. The shielding means 4, 6 is shown in its nonshielding position in FIG. 1, and a support means is provided to support this shielding means for movement from its nonshielding position to a shielding position in which the lever 4 is fragmentarily indicated in phantom lines in FIGS. 2 and 3. This support means includes a stationary pivot shaft 5 extending through suitable openings of the levers 4 and 6 so as to support the latter for swinging movement about a common axis between the nonshielding and shielding positions. Both of the levers 4 and 6 have lugs from which extend a pair of pins which engage the free ends of a wire spring 7 which extends around the shaft 5 and which also forms part of the shielding means. This spring 7 functions, by engagement with these pins, to hold the levers 4 and 6 normally in a given angular position with respect to each other. Thus, the lever 6 is maintained by a positioning means described below in the position illustrated in FIG. 1. The spring 7 is maintained by the pin which projects from the upper lug of the lever 6 also in the position shown in FIG. 1, and the right free end of the spring 7 extends beneath the pin of the lever 4 so as to support the latter in the nonshielding position when the parts are in the position of FIG. 1. The control lever 6 of the shielding means has affixed thereto a plate 8 which terminates in a lower edge forming an edge portion of the shielding means to be engaged by the releasable holding means referred to below.

A positioning means is provided for positioning the shielding means in its nonshielding position. This positioning means includes a positioning lever 9 in the form of a bellcrank also supported for swinging movement on the pivot shaft 5. At its lower region the downwardly extending arm of the bellcrank 9 is formed with a camming slot 9a having the curvature shown in FIGS. 1-3. At the right end portion of its horizontal arm, as viewed in FIGS. 1-3, the bellcrank 9 has a rearwardly extending lug 9b which extends beneath and engages the lower edge of the control lever 6. It is to be noted that this lug 9b does not extend beneath the lever 4.

The positioning means 9 responds to operation of the self-timer for returning the shielding means to its nonshielding position in a manner described below. Although all of the details of the self-timer are not illustrated, the drawings do illustrate the manually operable self-timer setting means 10 which is in the form of a rotary lever capable of being turned from the position shown in FIGS. 1 and 2, which is the inactive position, to the activating position shown in phantom lines in FIG. 3. As is well known since the self-timer is conventional, when the setting lever 10 is rotated to the position of FIG. 3, this manually operable setting means is placed in an activating position activating the self-timer so that it is ready for operation. The rotary lever 10 eccentrically carries a camming pin 10a which extends parallel to the shaft 5 and the turning axis of the lever 10 while being spaced from the latter axis. Thus, the result is that when the lever 10 is turned to the position of FIG. 3, the pin 10a will coact with the slot 9a for swinging the lever 9 in a clockwise direction from the positions of FIGS. 1 and 2 into the position of FIG. 3. As is well known, during running down of the self-timer, the lever 10 returns to the inactive position shown in FIGS. 1 and 2, and the result is that at the same time the camming pin 10a coacts with the slot 9a for returning the positioning means 9 into the position of FIGS. 1 and 2.

A spring means is formed by a spring 11. The pin at the upper lug of the control lever 6 which engages the spring 7 extends forwardly to be connected to the upper end of the spring 11. The lower end of the spring 11 is connected with a pin which is carried by and fixed to the positioning lever 9. The location of the spring means 11 is such that this spring means will become tensioned to an increasing extent as the lever 9 swings from the position of FIGS. 1 and 2 into the position of FIG. 3. Thus, the spring means 11 will store energy for urging the shielding means into its shielding position when the manually operable setting means 10 is displaced from its inactive position to its activating position. The positioning means 9 responds automatically to this displacement of the setting means 10 for storing this energy in the spring means 11.

AS was indicated above, a releasable holding means is provided for releasably holding the shielding means in its nonshielding position. This releasable holding means is formed by the lever 12 which is in the form of a bellcrank swingable about the axis of the pin or screw 14 carried by any stationary part of the camera. The portion 12a of the lever 12 extends beneath the edge portion of the shielding means formed by the lower end of the plate 8. This portion 12a carries a stop plate 15 which engages the plate 8 so as to limit swinging of the lever 12 about the pin 14 by a spring means 13. Thus, the spring means 13 acts as illustrated most clearly in FIG. 1 to urge the lever 12 in a counterclockwise direction so that the plate 15 is urged against the plate 8, to limit the swinging of the lever 12 while locating its portion 12a beneath the lower edge of plate 8, thus preventing swinging of the shielding means to its shielding position. Therefore, when the lever 9 is swung to the position of FIG. 3 in the manner described above, it is the releasable holding means 12 which prevents movement of the shielding means to its shielding position, so that in this way the spring means 11 will become tensioned to have stored therein a force which subsequently will swing the shielding means to its shielding position.

At its end distant from the plate 8, the lever 12 has a downwardly extending lug 12b. This lug is adapted to be engaged by a manually operable starting means 16 which is available to the operator for starting the operation of the self timer. Thus, when the lever 10 is swung to the activating position of FIG. 3, the button 16 will become accessible so that the operator can depress this button in order to start the operation of the self-timer in a well-known manner. With the structure of the invention, this actuation of the starting means 16 will provide through the lug 12b a swinging of the lever 12 in a clockwise direction, in opposition to the spring 13, so that the lever 12 will now be displaced by the starting means 16 to the release position releasing the shielding means for movement to its shielding position shown in phantom lines in FIGS. 2 and 3. Therefore, with the structure of the invention it is only upon actual manipulation of the starting means 16, in order to start the operation of the self-timer, that the shielding means is released for movement to its shielding position. After the lever 10 is moved to the activating position of FIG. 3, it is still possible to look through the viewfinder and to carry out settings of the camera in connection with determining the extent of exposure of the film therein.

A manually operable means is provided for operating the shielding means independently of the self-timer. This manually operable means includes the manually turnable lever 17 supported for swinging movement by a pivot 18. The lever 17 has an operating portion or button 17' which can be engaged by the operator, so that the operator can swing the lever 17 in a clockwise direction from the position of FIG. 1. Operatively connected with the lever 17 is an overcenter spring means 19 which urges the lever 17 in a counterclockwise direction as long as the spring 19 is above the axis of the pin 18, as viewed in FIGS. 1-3. However, when the operator turns the lever 17 in a clockwise direction through a distance sufficient to displace the spring 19 below the axis of the pin 18, then the spring 19 will urge the lever 17 in a clockwise direction. FIGS. 2 and 3 illustrate a stop pin 39 against which the lever 17 is urged by the spring 19. At its end distant from the pivot 18 the lever 17 has an operating pin 20 engaging the upper edge of the shielding lever 4 so that turning of the lever 17 in a downward direction will bring about displacement of the lever 4 to the shielding position. This movement of the lever 4 by the manually operable means 17 causes swinging of the lever 4 independently of the lever 6 of the shielding means, in opposition to the force of the spring 7 which at this time seeks to return the lever 4 back into the solid line position of FIGS. 1 and 2. It will be noted that in FIG. 2 the lever 17 is fragmentarily shown in the position it takes when it has been depressed with the overcenter spring means 19 now urging the lever 17 in a clockwise direction and with the pin 20 now engaging the lever 4 so as to maintain it in the shielding position shown in phantom lines in FIG. 2. The spring 19 is strong enough to overcome the force of the spring 7.

As was pointed out above, the illustrated structure includes the tiltable mirror 3 which receives the light from the objective and directs this light up through the viewfinder, as is well known in single-lens reflex cameras. This mirror 3 has a frame 3' which fixedly carries a pin 21. The lever 17 has an extension 17b which provided with a downwardly extending lug 17c and the bottom end of this lug is situated in the path of movement of the pin 21 when the mirror 3 is snapped up to its horizontal position displaced above the optical axis when an exposure is made. Thus, the swinging of the mirror 3 to its upper position will cause the pin 21 to act on the extension 17b for returning the lever 17 to the position illustrated in the drawings where it engages the stop 39, and of course at this time the spring 19 is above the axis of the pin 18 so as to maintain the lever 17 in its rest position shown in the drawings. It is also possible to provide a construction where the lever 17 is restored to its rest position by downward movement of the mirror 3. In any event, upon return of the manually operable means 17 to its rest position, the spring 7 returns the shielding means to its nonshielding position where the lever 4 is again situated beyond the path of the viewfinder light.

Referring now to FIG. 4, there is schematically shown therein the wall 40 of the housing for the mirror actuating structure of the single-lens reflex camera. The block diagram at the right of FIG. 4 illustrates the circuitry for determining automatic exposure. FIG. 4 shows the mirror-driving lever 22 supported for swinging movement about a pin or screw carried by the wall 40. A spring 25 is tensioned, when the shutter is cocked, so as to urge the lever 22 to turn in a counterclockwise direction, as viewed in FIG. 4. Thus, one end of the spring 25 is connected with the lower left end of the lever 22, while the other end is connected with a pin projecting from a suitable lever 24 which is swung in a counterclockwise direction, as viewed in FIG. 4, when the shutter-cocking lever 23 is displaced to the right, as viewed in FIG. 4, in connection with cocking of the shutter. Until the shutter is released, however, the lever 22 is locked against the turning movement by the tensioned spring 25 by the coaction of a stop pin 28 with the end of a lever 26. This lever 26 is situated in the path of downward movement of the shutter release element 27. Thus, only when the shutter release element 27 is depressed will the lever 26 turn in a clockwise direction to be displaced from the holding pin 28, thus releasing the driving lever 22 so that it can be swung by the spring 25 in a counterclockwise direction, enabling the arm 22a thereof to engage a pin projecting from the shutter-tilting lever 29. The wall 40 is provided with a slot 41 having the configuration illustrated in FIG. 4, and the lever 29 has distant from the lever 22 a pin extending into a slot in the frame of the mirror 3 for swinging the latter up to the phantom line position shown for the frame 3' in FIG. 4, when the shutter is tripped to make an exposure.

During viewing of the object through the viewfinder, when the camera is set to make an exposure, the diaphragm is in its wide open position to facilitate viewing of the object, as is well known. However, the diaphragm may be preset to a given aperture, and just before the exposure is made the diaphragm is automatically stopped down to the selected aperture. For this purpose the lever 22 has the arm 22b engaging the pin 31 of a swingable diaphragm actuating lever 30 having a lug 32 engaging the pin 33 so that when the latter is actuated by the lever 30 the diaphragm will be set to the proper aperture for the particular exposure.

The upper end of the arm 22b carries a switch-operating pin for changing over the switch mechanism 34 from the illustrated position where the exposure information is stored in the memory circuit to the operating position where this information of the memory circuit is used to automatically adjust the camera to provide a proper exposure. Thus, the switch mechanism 34 switches over the information stored in the memory circuit to the exposure-adjusting circuit. This information provided at the input circuit for the storage of the exposing information is calculated based upon the light conditions detected by the photoconductive element and the manually set conditions transmitted into the circuit by way of the resistor shown at the upper right of the block diagram. Thus, this resistor can be set according to the film speed, the selected diaphragm aperture, or the selected exposure time, and these manually selected exposure factors together with the lighting factors detected by the photoconductive element are transmitted through suitable equivalent circuits and the calculating circuit to the memory circuit. Thereafter, when the exposure is made, this information stored in the memory circuit is used for automatic exposure adjustment. Thus, in the case where the operator selects a given exposure aperture for the diaphragm, the calculating circuit will provide a proper exposure time to be transmitted to the exposure-adjusting circuit when the exposure is made. On the other hand it is also possible to provide an arrangement where it is the exposure aperture which is automatically determined.

FIG. 4 illustrates schematically how the pin 21 is displaced from the lower position 21a to the upper position 21b with the lower end of the lug 17c situated in the path of movement of this pin, so that when the frame 3' is in the upper horizontal position shown in FIG. 4, the lever 17 will be returned to its rest position.

Thus, with the structure described above when an exposure is to be made the shutter-cocking element 23 will be operated so as to place the parts in the position shown in FIG. 4. In this way the spring 25 is tensioned so as to store the driving force required for the lever 22. Also, the camera will be operated so that the memory circuit will have stored therein the information required for the proper exposure. Assuming that the self-timer is to operate, the operator will first turn the setting means 10 from the inactive position of FIGS. 1 and 2 into the activating position of FIG. 3 so that the positioning means 9 will respond for tensioning the spring means 11. Of course, the releasable holding means 12 at this time coacts with the plate 8 for maintaining the shielding means in its nonshielding position. Thus, adjustment of the camera to provide a proper exposure can still be carried out at this time.

When the exposure is to be made the operator will manipulate the starting means 16, so that the releasable holding means 12 is displaced to its release position, where the end of lever 12 extending beyond the plate 15 is withdrawn from the plate 8, with the result that the spring 11 turns the control of lever 6 down to the lug 9b and of course through the spring 7 the shielding lever 4 follows this movement of the control lever 6, so that the shielding means will now be in the shielding position shown in phantom lines in FIG. 3. In this position the shielding means interrupts the travel of viewfinder light.

After the self-timer has run down, through the preset interval, the shutter is tripped to make the exposure. As a result the lever 22 is rotated by the spring 25 to actuate the switch mechanism to bring about the proper exposure in accordance with the information stored in the memory circuit. The lever 30 is actuated at this time to stop the diaphragm down to the proper aperture. The lever 22 at this time turns the driving lever 29 so that the mirror 3 snaps up to its horizontal position.

Upon return of the lever 10 to its inactive position, the positioning means 9 responds through the camming pin 10a and the slot 9a so as to again assume the position shown in FIGS. 1 and 2 and the lug 9b has in the meantime returned the control lever 6 to the nonshielding position. Through the spring 7 the shielding lever 4 has also been returned to the nonshielding position. As soon as the lever 6 has been raised sufficiently by the lug 9b, the lever 12 snaps beneath the plate 8, so that the releasable holding means again acts to releasably hold the shielding means in its nonshielding position. Thus, all of the parts have again been restored to the position illustrated in FIGS. 1 and 2.

When it is desired to shield the viewfinder without using the self-timer, the operator need only depress the button 17 so as to turn the manually operable lever 17 in a clockwise direction, as viewed in the drawing. This extent of turn need only be sufficient to displace the overcenter spring 19 beyond its dead center position where it moves below the axis of the pin 18, and the pin 20 will of course turn the shielding lever 4 independently of the lever 6 to the shielding position, in opposition to the spring 7. If the parts are in this position and it is desired to focus the camera and make exposure adjustments, the operator need only raise the button 17' so that the spring 19 is again displaced through its dead center position, and the spring 7 will restore the lever 4 to its nonshielding position. On the other hand, if the lever 4 has been placed in this way independently of the self-timer, in its shielding position when the mirror 3 snaps up in connection with the making of an exposure, the pin 21 will engage the lug 17c so as to act on the lever 17 to return the parts to their initial position where the shielding lever 4 will be displaced back to its nonshielding position. Thus, the parts are automatically returned after each exposure to a condition where the operator is free to make further adjustments, if necessary, in connection with the next exposure, without requiring any manipulations in connection with a cover or the like for eliminating shielding of the viewfinder.

It is apparent, therefore, that with the above-described structure of the invention, when the self timer is used, the shielding means is reliably displaced to its shielding position preventing any erroneous exposures as a result of an improper influence on the exposure-adjusting mechanism by light which might happen to enter through the viewfinder. Thus, an accurate exposure under self-timer operation is assured. At the same time, even after the self-timer has been activated, it is possible to make adjustments of the camera because the shielding does not take place until manipulation of the button 16 to start the timer operation. Thus, with the structure of the invention even if the self-timer has been activated, it is possible to make adjustments of the camera. This feature is of considerable significance inasmuch as it avoids the necessity of turning the self-timer to its inactive position if it should be desired to further adjust the camera after the self-timer has been activated but before the exposure is made with the actual running down of the self-timer. Also, it is clear that with the invention it is possible at any time to bring about the shielding action independently of the self-timer, with automatic return of the shielding means to its nonshielding position after exposure is made because of the coaction between the mirror and the lever 17 as described above. Thus, with the structure of the invention, it is possible when using cameras which measure light internally, after the light has passed through the objective to bring about effective shielding for any purpose without any inconvenience.

What is claimed is:

1. In a camera, viewfinder means providing a predetermined path for viewfinder light, shielding means having a nonshielding position situated beyond said path, support means supporting said shielding means for movement from said nonshielding position to a shielding position extending across said path for interrupting the travel of viewfinder light therealong, releasable holding means releasably holding said shielding means in said nonshielding position thereof, manually operative self-timer setting means having an inactive position and being movable from said inactive position to an active position for activating a self-timer preparatory to operation thereof, and manually operable starting means for starting the operation of the self-timer after said setting means has been displaced to said activating position, said starting means coacting with said releasable holding means for displacing the latter from a holding position releasably holding said shielding means in said nonshielding position to a release position releasing said shielding means for movement to said shielding position thereof, whereby said shielding means will interrupt the travel of viewfinder light along said path when the self-timer is started.

2. The combination of claim 1 and wherein a positioning means coacts with said setting means and said shielding means for responding to return of said setting means to said inactive position thereof to reposition said shielding means back in said nonshielding position thereof.

3. The combination of claim 2 and wherein a spring means coacts with said releasable holding means for urging the latter to said holding position thereof, and said spring means automatically returning said holding means to said holding position upon return of said shielding means to said nonshielding position by said positioning means.

4. The combination of claim 3 and wherein said shielding means includes at least one lever, said support means supporting said lever for swinging movement about a given axis, and said positioning means including a positioning lever also supported by said support means for swinging movement about said axis and operatively connected to said setting means to be turned thereby, and second spring means operatively connected with said levers for urging said shielding means from said nonshielding to said shielding position thereof with a force which is at least partially increased upon displacement of said setting means from said inactive to said activating position, so that upon displacement of said holding means by said starting means to said release position and said second spring means will urge said shielding means to said shielding position thereof.

5. The combination of claim 4 and wherein said positioning lever has a lug situated in the path of movement of said lever of said shielding means when the latter is displaced to said shielding position by said second spring means, so that said positioning lever acts through said lug on said lever of said shielding means to return the latter to said nonshielding position upon return of said setting means to said inactive position thereof.

6. The combination of claim 5 and wherein said positioning lever is formed with a camming slot, said setting means being in the form of a rotary lever having an eccentric pin received in the latter slot for camming said positioning lever during the rotation of the setting lever.

7. The combination of claim 5 and wherein said lever of said shielding means has an edge portion, said releasable holding means being in the form of a release lever swingable about an axis perpendicular to the axis of turning of said shielding means and having a portion against which said edge portion of said shielding means is urged by said second spring means, said starting means turning said lever of said releasable holding means in a direction displacing said portion thereof away from said edge portion of said shielding means.

8. The combination of claim 1 and wherein said shielding means includes a pair of levers one of which is a control lever and the other of which is a shielding lever which has a shielding portion, said support means supporting both of said levers for swinging movement about a predetermined axis, and spring means coacting with said levers for yieldably maintaining them at predetermined angular positions with respect to each other, and manually operable means coacting with said shielding lever for swinging the latter about said axis independently of said control lever to provide an interruption in the travel of viewfinder light along said path independently of operation of the self-timer.

9. The combination of claim 8 and wherein said manually operable means includes a manually turnable lever having a portion engaging said shielding lever and an overcenter spring means coacting with said manually operable lever for maintaining the latter either in a rest position where said shielding lever is in a nonshielding position or in a holding position releasably holding said shielding lever in a shielding position.

10. The combination of claim 9 and wherein the camera is a single-lens reflex camera having a retractable mirror which swings away from the optical axis when an exposure is to be made, said mirror having a frame with a pin projecting therefrom and said manually operable lever having a lug situated in the path of movement of the latter pin so that when said mirror swings away from the optical axis said pin will engage said lug of said manually operable lever to return the latter to its rest position.